(12) United States Patent
Lee et al.

(10) Patent No.: US 9,140,200 B2
(45) Date of Patent: Sep. 22, 2015

(54) CONTROL METHOD OF DIESEL VEHICLE

(75) Inventors: Heungseok Lee, Seoul (KR); Chang Kook Chae, Suwon-si (KR); Sukil Oh, Suwon-si (KR); Wan Soo Oh, Yongin-si (KR); Jin Hyun Kim, Seoul (KR); Koo Tae Kang, Seoul (KR); Kwang Min Won, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 810 days.

(21) Appl. No.: 13/315,126

(22) Filed: Dec. 8, 2011

(65) Prior Publication Data

US 2013/0037001 A1 Feb. 14, 2013

(30) Foreign Application Priority Data

Aug. 12, 2011 (KR) .................. 10-2011-0080717

(51) Int. Cl.
*F02D 41/00* (2006.01)
*F02D 41/08* (2006.01)

(52) U.S. Cl.
CPC ........ *F02D 41/0052* (2013.01); *F02D 41/0055* (2013.01); *F02D 41/08* (2013.01); *F02D 2041/0022* (2013.01); *F02D 2200/021* (2013.01); *F02D 2200/0414* (2013.01); *F02D 2200/101* (2013.01); *F02D 2200/501* (2013.01); *F02D 2200/602* (2013.01); *Y02T 10/47* (2013.01)

(58) Field of Classification Search
CPC ..... F02D 41/00; F02D 41/0052; F02D 41/08; F02D 41/0055; F02D 2041/0022
USPC .......... 123/339.23, 339.22, 339.14, 399, 403, 123/568.19, 568.21, 568.22
See application file for complete search history.

(56) References Cited

U.S. PATENT DOCUMENTS

| 5,606,952 | A | * | 3/1997 | Kanno et al. ............. 123/406.74 |
| 6,152,118 | A | * | 11/2000 | Sasaki et al. ............. 123/568.21 |
| 2006/0011180 | A1 | * | 1/2006 | Sasaki et al. ................. 123/698 |
| 2007/0056282 | A1 | * | 3/2007 | Iwaszkiewicz ................. 60/599 |
| 2007/0213919 | A1 | * | 9/2007 | Magarida et al. ............. 701/102 |

FOREIGN PATENT DOCUMENTS

| JP | 2002-30946 | 1/2002 |
| JP | 4415864 | 2/2010 |
| KR | 10-0727191 | 6/2007 |

* cited by examiner

*Primary Examiner* — Stephen K Cronin
*Assistant Examiner* — Xiao Mo
(74) *Attorney, Agent, or Firm* — Morgan, Lewis & Bockius LLP

(57) ABSTRACT

An idle throttle valve control method of a diesel vehicle, may include a first step of determining whether an idle entry condition of the vehicle may be satisfied, a second step of controlling a throttle valve based on an air amount map and controlling an exhaust gas recirculation (EGR) valve based on an EGR map, when the first step may be satisfied, a third step of determining whether an idle release condition may be satisfied during the second step, and a fourth step of determining whether an EGR return condition may be satisfied, when the idle release condition may be satisfied in the third step.

13 Claims, 4 Drawing Sheets

(a)

(b)

CONTROL METHOD OF DIESEL VEHICLE

CROSS-REFERENCE TO RELATED APPLICATION

The present application claims priority to Korean Patent Application No. 10-2011-0080717 filed in the Korean Intellectual Property Office on Aug. 12, 2011, the entire contents of which is incorporated herein for all purposes by this reference.

BACKGROUND OF THE INVENTION

1. Field of the Invention

The present invention relates to a control method of a diesel vehicle. More particularly, the present invention relates to a throttle valve control method that can prevent a sudden movement of a vehicle and improve noise of a vehicle when starting to move.

2. Description of Related Art

Generally, a diesel engine generates a lot of noise and vibration compared to a gasoline engine such that it does not satisfy the demand of a consumer for a quiet vehicle, wherein the loud noise and the vibration are main factors that deteriorate the product quality of the diesel vehicle. A diesel engine outputs a high torque in a practical RPM range and achieves high fuel efficiency compared to a gasoline engine such that there are merits such as a relative inexpensive fuel cost, but the loud noise and vibration are generated by a high compression ratio and a maximum cylinder explosion pressure. An explosion pressure size and a combustion pressure increment slope during combustion, structural strength and stiffness, and a power train of a vehicle are synthetically considered so as to improve the noise and vibration of the diesel engine, wherein it is known to be effective to control the combustion pressure that is a cause of the noise/vibration without an increment of cost and weight.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide a method for controlling an idle throttle valve of a diesel vehicle having advantages of improving idle noise and vibration of a diesel vehicle by reducing maximum combustion pressure and a pressure increment slope when controlling a model-based air amount through a throttle valve control.

In an aspect of the present invention, an idle throttle valve control method of a diesel vehicle, may include a first step of determining whether an idle entry condition of the vehicle is satisfied, a second step of controlling a throttle valve based on an air amount map and controlling an exhaust gas recirculation (EGR) valve based on an EGR map, when the first step is satisfied, a third step of determining whether an idle release condition is satisfied during the second step, and a fourth step of determining whether an EGR return condition is satisfied, when the idle release condition is satisfied in the third step.

The idle entry condition may include determining whether an idle condition is satisfied, determining whether an environmental condition is satisfied, and determining whether a function improvement condition is satisfied.

The idle condition is determined by a vehicle speed, an engine speed, and an accelerator pedal operating condition.

The idle condition is satisfied when the vehicle speed is less than or equal to 0, the engine speed is less than a predetermined value, and the accelerator pedal is not operated.

The environmental condition is determined by an outside temperature, a coolant temperature, and a temperature of a downstream side in an intercooler.

The environmental condition is satisfied when the outside temperature is between a predetermined maximum value and a predetermined minimum value, the coolant temperature is higher than a temperature value in a full warm-up condition, and the temperature of the downstream side in the intercooler is between a predetermined maximum value and a predetermined minimum value.

The function improvement condition is determined by a shift gear step, a brake signal, and a turbine speed.

The function improvement condition is satisfied when the shift gear step is N or P step, a brake is operated, and the turbine speed is between a predetermined maximum value and a predetermined minimum value.

An opening rate of the throttle valve is controlled by a predetermined target air amount, and an opening rate of the EGR valve is controlled by a predetermined EGR rate when the first step is satisfied.

The idle release condition may include a condition that a vehicle speed is detected or an accelerator pedal is operated.

The EGR return condition is determined by an overrun condition or a gear shifting condition.

The idle throttle valve control method may further include compensating a fuel injection factor map as a control factor affecting noise when the throttle valve is controlled.

An exemplary embodiment of the present invention has freedom to change the EGR ratio as much as a user wants to optimize fuel consumption, exhaust gas, and noise.

Also, the EGR rate is returned to normal in a gear shifting condition or an over-run condition such that abrupt movement and noise of the vehicle is reduced, wherein the abrupt movement is generated during the operation of the throttle valve and the EGR valve.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
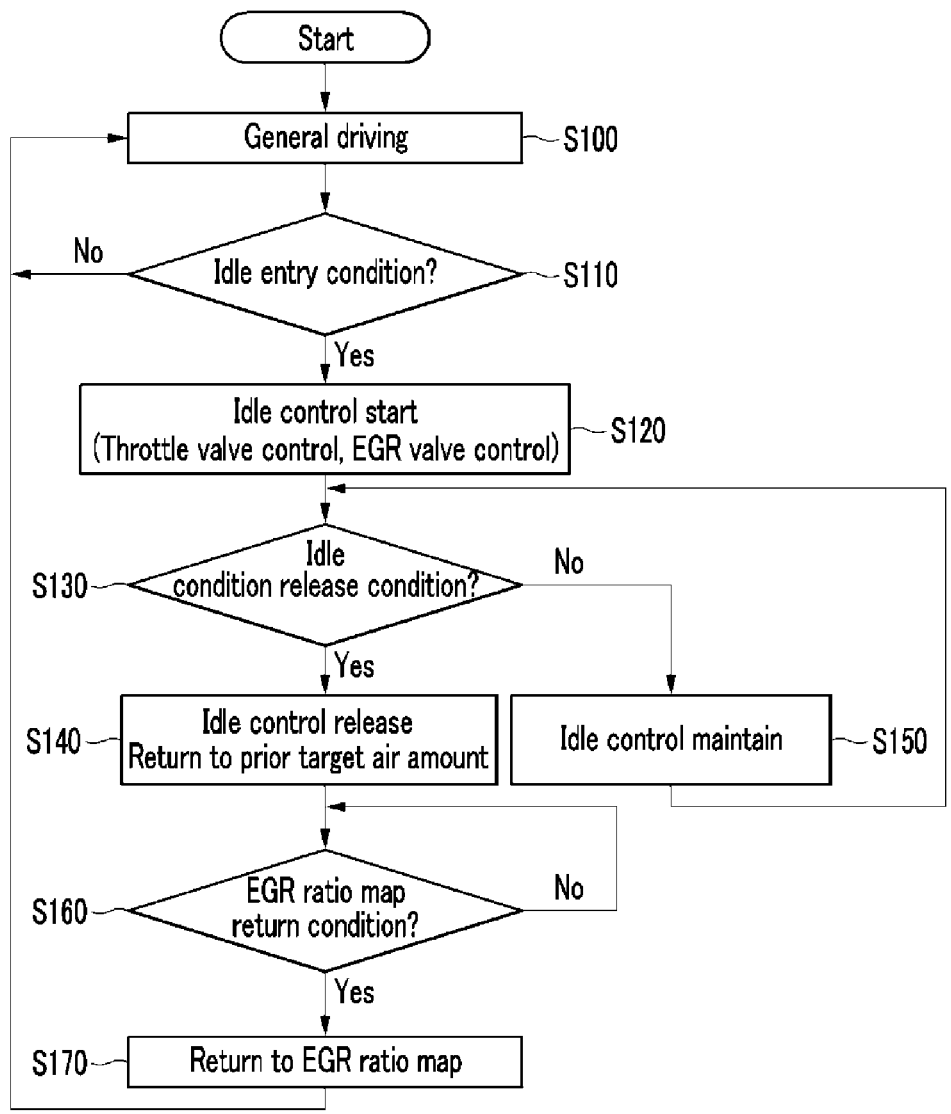
FIG. 1 is a flowchart for controlling a throttle valve in an idle condition according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, with reference to the accompanying drawings, the present invention will be described in order for those skilled in the art to be able to implement the invention.

FIG. 1 is a flowchart for controlling a throttle valve in an idle condition according to an exemplary embodiment of the present invention, wherein when an air amount based on a model is controlled according to an exemplary embodiment of the present invention, a method for controlling an idle throttle valve of a diesel vehicle: determines whether an idle condition is satisfied or not during running, controls a throttle valve and an EGR valve by using an air amount map and an EGR map, if the entry condition is satisfied, and does not control the EGR valve if the idle release condition is satisfied during the control and determines whether an EGR return condition is satisfied to control the EGR valve after the EGR map return condition is satisfied, such that a sudden movement of a vehicle that is caused by changing the opening rate of the EGR valve is reduced and an early stage starting noise that is caused by restricting EGR usage can be improved.

Firstly, it is determined whether an idle entry condition is satisfied, wherein the idle entry condition is determined by an idle condition determiner 100 that determines an idle condition by checking the idle condition, an environmental condition determiner 200 that determines an environmental condition, and a function condition determiner 300 for improving a function. If the idle entry condition is satisfied by the determiners, a throttle valve switch 400 is operated.

Figure 2:
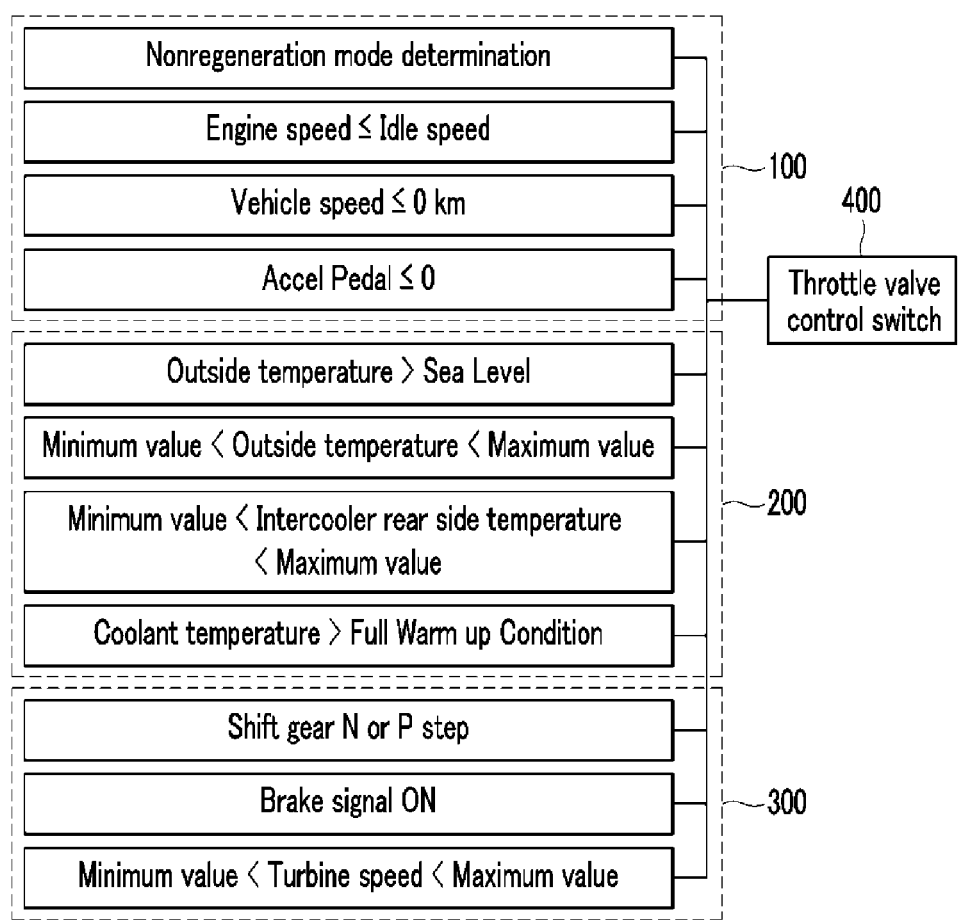
FIG. 2 shows an entry condition into an idle condition according to an exemplary embodiment of the present invention.

As shown in FIG. 2, the idle condition determiner 100 uses a vehicle speed, an engine speed, an accelerator pedal signal, etc., wherein it is determined that a vehicle is in an idle condition when a vehicle speed is 0, an engine speed is less than a predetermined value, or an accelerator pedal signal is 0%. The predetermined value denotes an idle rotation speed of the engine according to the engine condition.

The environmental condition determiner 200 uses an outside temperature, a coolant temperature, a temperature of a downstream side of an intercooler, etc., wherein the outside temperature is in a range from a predetermined maximum value to a predetermined minimum value, the downstream side temperature of the intercooler is in a range from a predetermined minimum value to a predetermined maximum value, and the coolant temperature is higher than a temperature at which the engine is in a fully warmed up condition.

Also, the function condition determiner 300 uses a shift gear step, a brake operating condition, a turbine speed, etc., wherein it is determined that a function can be improved when the shift gear step is an N or P step, the brake is being operated, or the turbine speed ranges from a predetermined minimum value to a predetermined maximum value. In other words, delayed departure of the vehicle is prevented and the side effect according to an abrupt change of opening rate of the valve is prevented, wherein the delayed departure or the side effect is generated during entry to throttle valve control and release from throttle valve control.

If the above entry conditions are satisfied, throttle valve control is started. In this process, an opening rate of the throttle valve and an opening rate of the EGR valve are controlled along a predetermined target air amount and a predetermined EGR rate.

While the throttle valve is being controlled during the above idle entry satisfaction condition, if an idle release condition is satisfied, the idle control is released to return to a normal target air amount (normal map). The release condition includes a condition that the vehicle speed is detected or the accelerator pedal is operated.

When the release condition is satisfied or the acceleration intention of a driver is detected, i.e., the brake pedal is not operated (OFF) or the accelerator pedal is operated, the throttle valve is immediately opened. However, if the EGR valve that was closed during the throttle valve control is opened, the air amount cannot be smoothly controlled such that the vehicle can be abruptly moved to generate discomfort. Accordingly, the EGR valve maintains its closed condition and the throttle valve is immediately opened, and it is determined whether a return condition to an EGR map is satisfied or not. The return condition includes an over-run condition or a gear shifting condition.

Hereinafter, an operating procedure according to an exemplary embodiment of the present invention will be described.

Firstly, an operating condition of an engine is detected so as to control the throttle valve and the EGR valve, and a modeling value is calculated. The operating conditions include the engine speed, the air amount, the intake air temperature, the boost pressure, the opening rate of a throttle valve opening, and the opening rate of the EGR valve.

The calculated modeling values are the opening rate of a throttle valve and the opening rate of an EGR valve.

The opening rate of the throttle valve and the opening rate of the EGR valve are respectively controlled by the target air amount map and the EGR map, wherein the map can be determined by a user and the opening rate of the EGR valve is controlled by changing the EGR map.

The idle entry condition is determined by the operating conditions, wherein if the engine speed is less than a predetermined idle rotation speed, the throttle valve switch 400 is operated in an idle condition, and the EGR map, the target air amount, and the min/max opening rate of the throttle valve are switched to a new map by the idle condition to control the throttle valve. In this switching moment, the throttle valve is closed.

The EGR map determines an EGR amount that is to be used during throttle valve control, and if the EGR amount is set to be 20% of the entire air amount by an user, the opening rate of the EGR valve is determined to achieve the target air amount, wherein the EGR amount ranges from 0 to 20%. As stated above, the user freely determines the range of the EGR usage amount, and the range of the EGR usage amount can be added as an adjustment factor when the ECU is mapped for optimizing fuel consumption, EM, and noise during the throttle valve control.

The EGR gas has not been conventionally used to improve the noise characteristic during throttle valve control, but the EGR gas is partially used to optimize fuel consumption and exhaust gas quality in accordance with an exemplary embodiment of the present invention.

The max/min value of the opening rate of the throttle valve and the target air amount is returned to an original map when the throttle valve control is released. However, the EGR rate maintains its early stage value of vehicle movement even when the throttle valve control is released.

Thereafter, when the throttle valve release condition is satisfied or an accelerator intention of a driver is detected, the throttle valve is fully opened to offer a necessary air amount for a driving. However, the EGR valve maintains its closed condition such that the abrupt movement at an early stage of the vehicle movement is reduced.

Hereafter, if the EGR map return condition is satisfied by an over-run condition, the EGR valve is opened. If the EGR valve is operated according to the EGR map return condition, the EGR valve is continuously operated according to the driving condition. The EGR map return condition differentiates return timing of the throttle valve and the EGR valve, when the throttle valve control release condition is satisfied and a driver accelerates the vehicle, to prevent abrupt movement of the vehicle that can be generated when the throttle valve and the EGR valve are simultaneously operated, and only uses the EGR valve control method to control the air amount to safely return to a non-idle condition.

In other words, while the throttle valve is closed by controlling the throttle valve in an idle condition, if the acceleration intention is detected by disengaging the brake pedal and operating the accelerator pedal, the throttle valve is immediately opened, but the EGR valve closed for a predetermined time.

In the above, if the EGR release condition is not satisfied, the idle throttle control condition is continued.

Also, an exemplary embodiment of the present invention compensates an injection coefficient map when controlling the throttle valve control to optimize the throttle valve control, and can offer a compensated map having control factors such as main injection timing, pilot fuel amount, pilot injection interval, rail pressure, and so on that affect fuel consumption, exhaust gas, and noise.

Figure 3:
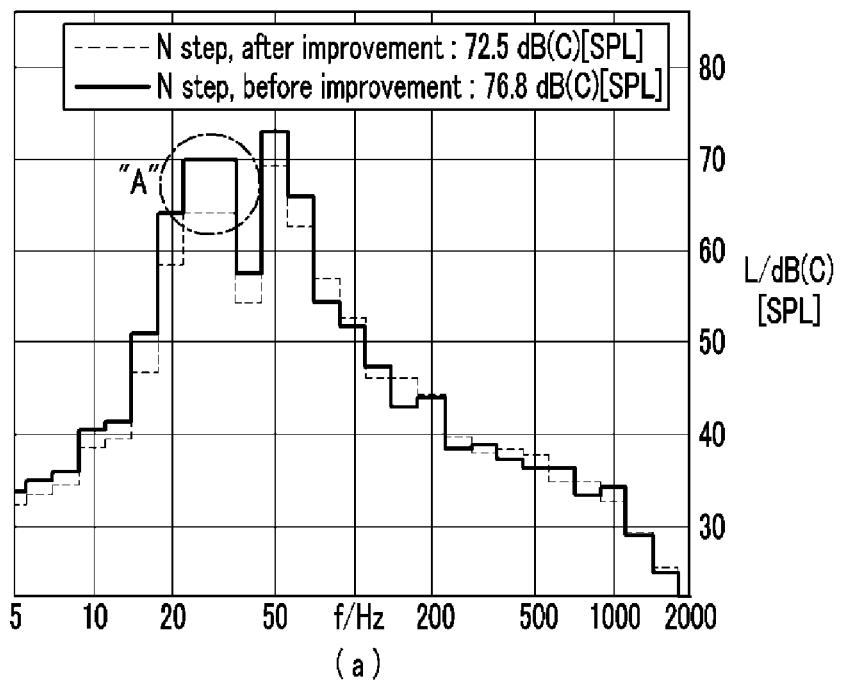
FIG. 3 is a graph showing effects of reducing noise in an idle condition according to an exemplary embodiment of the present invention.
Figure 3:
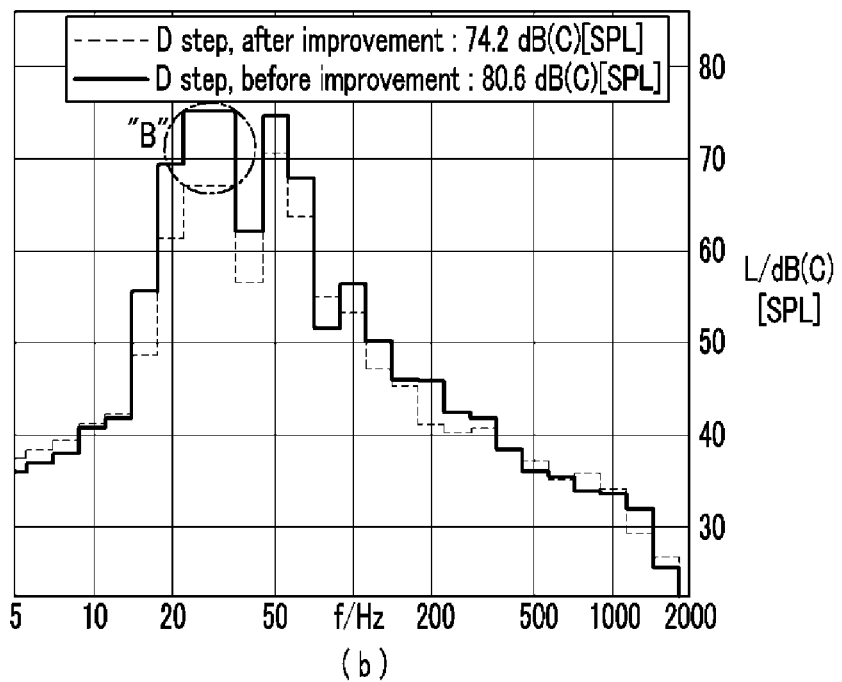

FIG. 3 is a graph showing effects of reducing noise in an idle condition according to an exemplary embodiment of the present invention, (a) of FIG. 3 shows noise improvement in an N step, and (b) of FIG. 3 shows noise improvement in a D step.

As shown in "A" and "B" of FIG. 3, there is a 4 dB improvement in the N step and a 6 dB improvement in the D step.

Figure 4:
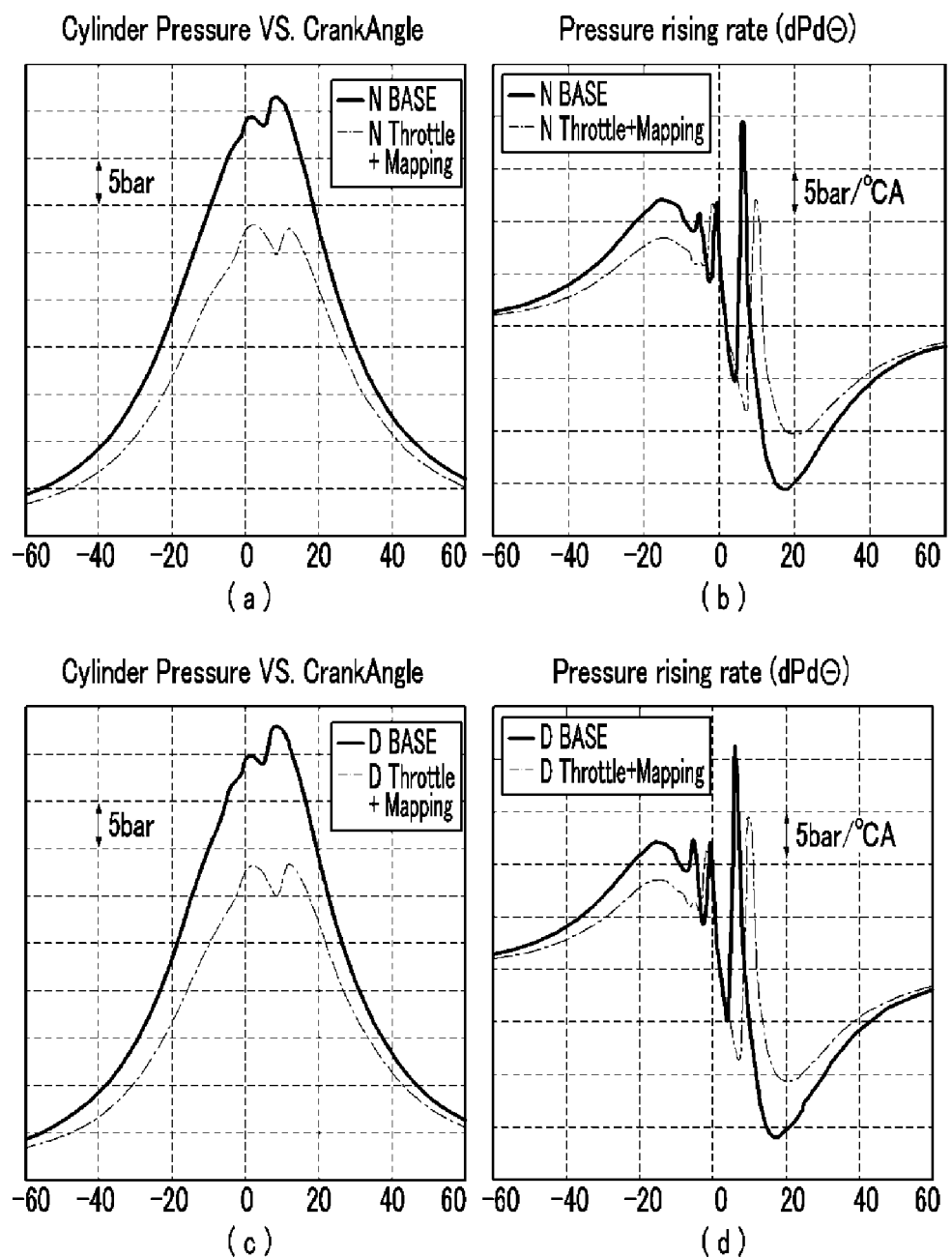
FIG. 4 is a graph measuring a combustion chamber pressure before and after controlling a throttle valve according to an exemplary embodiment of the present invention.

Also, FIG. 4 is a graph measuring combustion chamber pressures before and after controlling a throttle valve according to an exemplary embodiment of the present invention, showing a case of before improvement (a) and after improvement (b) in the N step, and showing a case of before improvement (c) and after improvement (d) in the D step. As described in (b) and (d) of FIG. 4, the maximum pressure and the pressure increment slope are changed compared with the condition before improvement.

In the N step, the maximum pressure is reduced from 46.2 bar to 33.0 bar, and a pressure increment slope (dp/dθ) is reduced from 2.0 to 1.5. Also, in the D step, the maximum pressure is reduced from 48.0 bar to 33.7 bar, and the pressure increment slope is reduced from 2.1 to 1.4.

As described above, the maximum combustion pressure and the pressure increment slope are reduced through the throttle valve control according to an exemplary embodiment of the present invention and therefore the noise and vibration of a diesel vehicle are improved in an idle condition.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An idle throttle valve control method for a diesel vehicle, comprising:
   determining whether an idle condition of the vehicle is satisfied;
   controlling a throttle valve based on an idle air map and controlling an exhaust gas recirculation (EGR) valve based on an idle EGR map, if it is determined that the vehicle is in the idle condition;
   determining whether an idle release condition is satisfied during idle control;
   controlling the throttle valve based on a normal air amount map, and maintaining the EGR valve as it is in the idle control, when the idle release condition is satisfied;
   determining whether an EGR map return condition is satisfied; and
   controlling the EGR valve based on a normal EGR map, if the EGR map return condition is satisfied;
   wherein the EGR valve EGR map return condition is satisfied when the vehicle is in an overrun condition or a gear shifting condition, and
   wherein the controlling of the EGR valve based on the normal EGR map starts at a time different than the controlling of the throttle valve based on the normal air amount map, thereby preventing abrupt movement of the vehicle, reducing noise generated by the vehicle or a combination thereof.

2. The idle throttle valve control method of claim 1, wherein the determining of whether the idle condition is satisfied includes:
   determining whether an environmental condition is satisfied; and
   determining whether a function improvement condition is satisfied.

3. The idle throttle valve control method of claim 2, wherein the idle condition is determined by a vehicle speed, an engine speed, and an accelerator pedal operating condition.

4. The idle throttle valve control method of claim 3, wherein the idle condition is satisfied when the vehicle speed is less than or equal to 0, the engine speed is less than a predetermined value, or the accelerator pedal is not operated.

5. The idle throttle valve control method of claim 2, wherein the environmental condition is determined by an outside temperature, a coolant temperature, and a temperature of a downstream side in an intercooler.

6. The idle throttle valve control method of claim 5, wherein the environmental condition is satisfied when the outside temperature is between a predetermined maximum value and a predetermined minimum value, the coolant temperature is higher than a temperature value in a full warm-up condition, and the temperature of the downstream side in the intercooler is between a predetermined maximum value and a predetermined minimum value.

7. The idle throttle valve control method of claim 2, wherein the function improvement condition is determined by a shift gear step, a brake signal, and a turbine speed.

8. The idle throttle valve control method of claim 7, wherein the function improvement condition is satisfied when the shift gear step is N or P step, a brake is operated, or the turbine speed is between a predetermined maximum value and a predetermined minimum value.

9. The idle throttle valve control method of claim 1, wherein an opening rate of the throttle valve is controlled by a predetermined normal air amount, and an opening rate of the EGR valve is controlled by a predetermined EGR rate when the vehicle is in an idle condition.

10. The idle throttle valve control method of claim 1, wherein the idle release condition includes a condition that a vehicle speed is detected or an accelerator pedal is operated.

11. The idle throttle valve control method of claim 1, further including compensating a fuel injection factor map as a control factor affecting noise when the throttle valve is controlled.

12. The idle throttle valve control method of claim 1, wherein the controlling of the throttle valve based on the normal air amount map fully opens the throttle valve.

13. The idle throttle valve control method of claim 1, wherein the maintaining of the EGR valve as it is in the idle control keeps the EGR closed, if the EGR is closed during the idle control.

* * * * *